(12) United States Patent
Barbieri et al.

(10) Patent No.: US 12,314,972 B2
(45) Date of Patent: *May 27, 2025

(54) INTERFACE FOR INTERACTING WITH TRANSFORMED DEAL DATA

(71) Applicant: Circupon, San Jose, CA (US)

(72) Inventors: Danielle Barbieri, Bluffton, SC (US); Brian Lawler, San Francisco, CA (US)

(73) Assignee: Circupon, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,376

(22) Filed: Feb. 24, 2023

(65) Prior Publication Data
US 2023/0214867 A1    Jul. 6, 2023

Related U.S. Application Data

(63) Continuation of application No. 16/557,800, filed on Aug. 30, 2019, now Pat. No. 11,610,215, which is a
(Continued)

(51) Int. Cl.
*G06Q 30/02*  (2023.01)
*G06F 16/951*  (2019.01)
(Continued)

(52) U.S. Cl.
CPC ....... *G06Q 30/0207* (2013.01); *G06F 16/951* (2019.01); *G06Q 30/0235* (2013.01)

(58) Field of Classification Search
CPC .............. G06Q 30/02; G06Q 30/0207; G06Q 30/0235; G06Q 30/0254; G06Q 10/067; G06Q 30/0246; G06F 16/951
See application file for complete search history.

(56) References Cited

U.S. PATENT DOCUMENTS 7,158,930 B2   1/2007  Pentheroudakis et al.
7,818,209 B1 * 10/2010  Lu ........................ G06Q 30/02
                                                   705/14.54
(Continued)

FOREIGN PATENT DOCUMENTS

EP     0512509 B1 *  7/1999  ............... G07G 1/12
WO   WO 2005/043338 A2 *  7/1999

OTHER PUBLICATIONS

L. Romaaszko; An Ensemble-Based Entity Recognition Solution for Detecting Consumer Products (English); 2012 IEEE 12th International Conference on Data Mining workshops (2012, pp. 865-868); Feb. 8, 2013 (Year: 2013).*

(Continued)

*Primary Examiner* — Marilyn G Macasiano
(74) *Attorney, Agent, or Firm* — Schwegman Lundberg & Woessner, P.A.

(57) ABSTRACT

Techniques for generating matchups of sale and coupon are described. For example, deal data that pertains to a sale deal and a coupon deal is received. A sale brand identification and a coupon brand identification are identified based on the deal data. A first set of deal data including the sale brand identification and corresponding to the sale deal, and a second set of deal data including the coupon brand identification and corresponding to a coupon deal are determined based on the deal data. A matchup of the sale deal and the coupon deal is generated-based on matching the sale brand identification and the coupon brand identification, detecting a sale deal type in the first set of deal data and a coupon deal type in the second set of data, and determining that a sale deal's validity period and a coupon deal's validity periods overlap and have not expired.

15 Claims, 10 Drawing Sheets

Related U.S. Application Data continuation of application No. 13/925,035, filed on Jun. 24, 2013, now Pat. No. 10,438,221.

(51) Int. Cl.
  *G06Q 30/0207* (2023.01)
  *G06Q 30/0235* (2023.01)

(56) References Cited

U.S. PATENT DOCUMENTS

| | | | |
|---|---|---|---|
| 8,606,788 B2 | 12/2013 | Chen et al. | |
| 8,676,829 B2* | 3/2014 | Chen | G06F 16/285 |
| | | | 707/767 |
| 10,438,221 B2* | 10/2019 | Barbieri | G06F 16/951 |
| 10,510,091 B1* | 12/2019 | Lesley | G06Q 30/0238 |
| 10,990,999 B1* | 4/2021 | Goforth | G06Q 30/0239 |
| 11,610,215 B2 | 3/2023 | Barbieri et al. | |
| 2005/0027670 A1 | 2/2005 | Petropoulos | |
| 2005/0108210 A1 | 5/2005 | Wang et al. | |
| 2005/0160014 A1 | 7/2005 | Moss et al. | |
| 2007/0073592 A1 | 3/2007 | Perry | |
| 2008/0243905 A1 | 10/2008 | Pavlov et al. | |
| 2010/0082447 A1 | 4/2010 | Lin et al. | |
| 2010/0268725 A1 | 10/2010 | Wang et al. | |
| 2011/0145251 A1 | 6/2011 | Lee et al. | |
| 2011/0251897 A1 | 10/2011 | Litvack et al. | |
| 2011/0289026 A1 | 11/2011 | Kannan et al. | |
| 2012/0084122 A1 | 4/2012 | Boehle | |
| 2012/0215611 A1 | 8/2012 | Korson et al. | |
| 2012/0323921 A1 | 12/2012 | Chen et al. | |
| 2013/0117094 A1* | 5/2013 | Jones | G06Q 30/0222 |
| | | | 705/14.35 |
| 2014/0046764 A1 | 2/2014 | Fox | |
| 2014/0081701 A1* | 3/2014 | Lakshminarayanan | |
| | | | G06Q 30/02 |
| | | | 705/7.29 |
| 2014/0095285 A1 | 4/2014 | Wadell et al. | |
| 2014/0188934 A1 | 7/2014 | Datta | |
| 2014/0195323 A1 | 7/2014 | Hankins | |
| 2014/0379450 A1 | 12/2014 | Barbieri et al. | |
| 2015/0142543 A1 | 5/2015 | Lellouche | |
| 2016/0180247 A1 | 6/2016 | Li et al. | |
| 2020/0097989 A1 | 3/2020 | Barbieri et al. | |

OTHER PUBLICATIONS

ISO/IEC/IEEE International Standard-Systems and software engineering—Vocabulary (English); ISO/IEC/IEEE 24765:2010(E) (2010), pp. 1-418); Nov. 14, 2011 (Year: 2011).*

"U.S. Appl. No. 13/925,035, Appeal Decision mailed Apr. 2, 2018", 23 pgs.

"U.S. Appl. No. 13/925,035, Examiner Interview Summary mailed Feb. 19, 2019", 4 pgs.

"U.S. Appl. No. 13/925,035, Examiner Interview Summary mailed Jun. 18, 2015", 3 pgs.

"U.S. Appl. No. 13/925,035, Final Office Action mailed Aug. 4, 2015", 52 pgs.

"U.S. Appl. No. 13/925,035, Non Final Office Action mailed Mar. 13, 2015", 31 pgs.

"U.S. Appl. No. 13/925,035, Non Final Office Action mailed Nov. 16, 2018", 55 pgs.

"U.S. Appl. No. 13/925,035, Notice of Allowance mailed May 31, 2019", 24 pgs.

"U.S. Appl. No. 13/925,035, Reply Brief filed Sep. 6, 2016 to Appeal Brief mailed Nov. 5, 2015" 26 pgs.

"U.S. Appl. No. 13/925,035, Response filed Mar. 18, 2019 to Non Final Office Action mailed Nov. 16, 2018", 19 pgs.

"U.S. Appl. No. 13/925,035, Response filed Jun. 15, 2015 to Non Final Office Action mailed Mar. 13, 2015", 25 pgs.

"U.S. Appl. No. 16/557,800, Examiner Interview Summary mailed Apr. 9, 2021", 3 pgs.

"U.S. Appl. No. 16/557,800, Examiner Interview Summary mailed Jun. 14, 2022", 3 pgs.

"U.S. Appl. No. 16/557,800, Final Office Action mailed Jul. 21, 2021", 34 pgs.

"U.S. Appl. No. 16/557,800, Final Office Action mailed Aug. 24, 2022", 18 pgs.

"U.S. Appl. No. 16/557,800, Non Final Office Action mailed Jan. 6, 2021", 55 pgs.

"U.S. Appl. No. 16/557,800, Non Final Office Action mailed Mar. 15, 2022", 48 pgs.

"U.S. Appl. No. 16/557,800, Notice of Allowance mailed Nov. 18, 2022", 15 pgs.

"U.S. Appl. No. 16/557,800, Preliminary Amendment filed Dec. 12, 2019", 11 pgs.

"U.S. Appl. No. 16/557,800, Response filed Jun. 7, 2021 to Non Final Office Action mailed Jan. 6, 2021", 19 pgs.

"U.S. Appl. No. 16/557,800, Response filed Jun. 15, 2022 to Non Final Office Action mailed Mar. 15, 2022", 19 pgs.

"U.S. Appl. No. 16/557,800, Response filed Oct. 24, 2022 to Final Office Action mailed Aug. 24, 2022", 12 pgs.

"U.S. Appl. No. 16/557,800, Response filed Nov. 22, 2021 to Final Office Action mailed Jul. 21, 2021", 19 pgs.

"U.S. Appl. No. 13/925,035, Appeal Brief filed Nov. 4, 2015", 48 pgs.

"U.S. Appl. No. 13/925,035, Response filed Mar. 3, 2016 to Notice of Non-Compliant Appeal Brief mailed Feb. 9, 2016", 10 pgs.

"flipp", [Online] Retrieved from the internet: <https://flipp.com/home accessed May 23, 2019>, (2019).

* cited by examiner

INTERFACE FOR INTERACTING WITH TRANSFORMED DEAL DATA

CROSS REFERENCE TO RELATED APPLICATIONS

This application is a continuation of U.S. application Ser. No. 16/557,800, filed Aug. 30, 2019, which is a continuation of U.S. application Ser. No. 13/925,035, filed Jun. 24, 2013, which applications are incorporated hereby reference in their entirety.

TECHNICAL FIELD

The present disclosure generally relates to data processing systems. More specifically, the present disclosure relates to methods, systems, and computer program products that generate combinations of sale deals and coupon deals based on automatically identifying sale deals and the coupon deals that have matching brands and overlapping and non-expired validity periods.

BACKGROUND

As a method to increase sales, a retailer may discount the prices of certain products offered for sale. The retailer may discount all the products of a certain brand or selectively decrease the prices of particular products of a certain brand. It is not uncommon for retailers to advertise such sales in a mass-distributed advertisement publication (e.g., a weekly circular).

Sometimes, a manufacturer of a brand of products (or a retailer) may offer discounts for one or more products within the brand in the form of coupons. Such coupons may or may not be combined with the sales discounts advertised in the circulars or with other coupons. Traditionally, to find a combinable sale deal or a coupon deal a person may manually search the circulars or any other available sources of coupons or other discounts. This may be very time consuming and tedious.

DESCRIPTION OF THE DRAWINGS

Some embodiments are illustrated by way of example and not limitation in the FIGS. of the accompanying drawings, in which.

DETAILED DESCRIPTION

Figure 1:
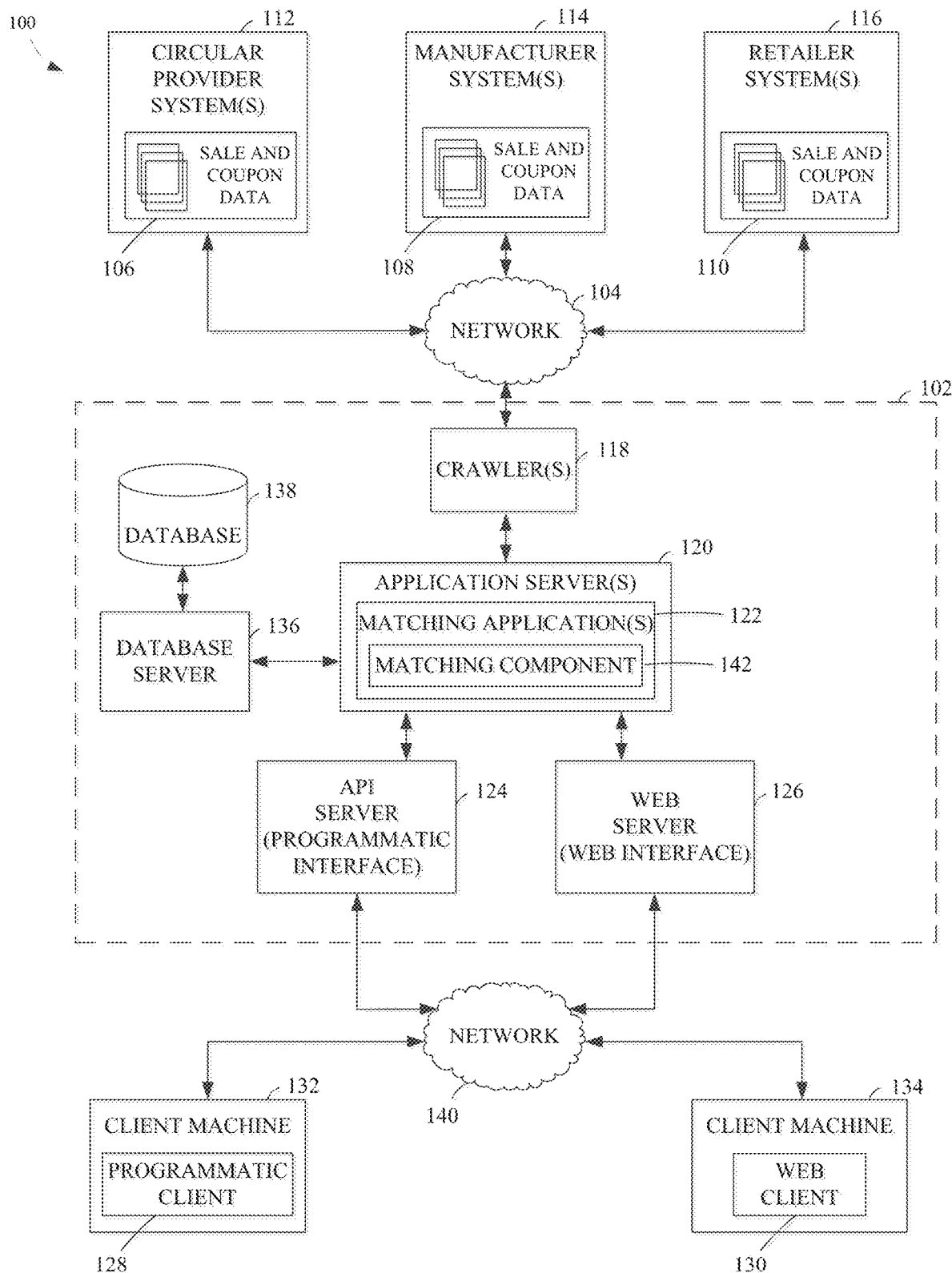
FIG. 1 is a network diagram illustrating various functional components of a discount matching system with a rules engine, consistent with some example embodiments, for use with a wide variety of applications, and specifically for automatically generating combinations of sale deals and coupon deals based on automatically identifying matching brands and validity periods of the sale deals and the coupon deals.

The present disclosure describes methods, systems, and computer program products for generating combinations of sale deals and coupon deals based on automatically identifying sale deals and coupon deals that have matching brands and overlapping and non-expired validity periods. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

Shopping weekly sales offered by many retail stores may be a fast and easy way for a consumer to save money. The knowledge of which retailers offer such sales and when may be financially very beneficial to the average household, especially long-term. However, the money-saving effect may be enhanced even more by combining the weekly sales with coupons that match the brands or products that are on sale.

The subject matter described herein may allow a discount matching system (also "system") to generate combinations (also "matchups") of deals offered by retailers, manufacturers, suppliers, vendors of sale and coupon data etc. based on determining that certain deals may be combined (or matched). For purposes of the present disclosure, the term "deal" is used broadly and means a bargain, discount, or arrangement for mutual advantage. Examples of deals may be, but are not limited to, a sale or a coupon.

A sale may be a special promotion offered by a retailer for a specified length of time. In some example embodiments, the sale may include a discounted price or a non-monetary bonus (e.g., store rewards points). A sale may be advertised in a weekly circular publication, a newspaper, a flier, etc. Also, information about a sale may be communicated electronically, for instance, in an email sent to a user or on a retailer's web site.

A coupon may be any type of special incentive offered by a retailer or manufacturer for a specific brand, a specific item, or set of specific items for a specified length of time. In some example embodiments, the coupon may include a discounted price or a non-monetary bonus. A coupon may be offered by a retailer, for example, in the form of an "in-store" (e.g., online or brick-or-mortar store) coupon. Online coupons may be printable or electronic. Sometime, a retailer, in addition to advertising a sale in a weekly circular, may provide a coupon in the weekly circular (e.g., a printed coupon). Further, manufacturer coupons may be available from many sources, such as the Sunday paper, online coupon distributors, or the manufacturer itself (e.g., the manufacturer's web site).

The system may receive data that pertains to different sale deals and coupon deals from a variety of sources and in a variety of formats. Examples of deal sources may be, but are not limited to, retailers, manufacturers, suppliers, mass media, vendors of sale data and coupon data, etc. In some example embodiments, the deal data is received from one or more crawlers that browse the World Wide Web (or specific Uniform Resource Locators ("URLs")) according to a set of policies provided by the system. A crawler is an Internet bot, also known as a web robot or simply bot, which is a software application that runs automated tasks over the Internet. A crawler may be directed to a particular data source (e.g., a web site) to access and download a portion of the content of the web site and store it in a database (e.g., as raw HTML code). The crawler may also extract and analyse text and images. In certain example embodiments, the deal data is received in one or more data feeds or in one or more spreadsheets received from various data source operators under special arrangements. Alternately, or in addition, the deal data may be received from various data sources via available application programming interfaces (APIs).

In certain example embodiments, the determination that two distinct deals are matchable (or combinable) is based on determining that the brands of the products offered for sale in the two deals may be matched (e.g., are the same), detecting that one of the deals is a sale deal and the other is a coupon deal, and determining that the validity periods of the sale deal and coupon deal overlap (e.g., have some time period in common) and the expiration (e.g., valid-to) dates of the sale and coupon deals have not passed.

A cumulation of bargains may provide a purchaser with a larger discount and, when applied against the original price of a product, may result in a lower final price for the product. Also, a purchaser may benefit from the system's ability to access and process large amounts of online data in order to automatically search and filter data that is pertinent to available deals. Information may be derived from the data pertaining to various discount deals and may be used to automatically generate discount matchups that include two or more deals that are combinable. The system then may present the resulting matchups to a user (e.g., a purchaser).

For example, a user of the system may search for discounts that pertain to a brand or a product. In some example embodiments, the user uses a browser to initiate the search. A user interface presented in the browser may facilitate a search based on a brand name, a category of products, a keyword, etc. The system, in response to the user's search query, may identify and present a listing of search results that may include one or more matchups of deals that correspond to the search criteria selected or entered by the user. Examples of matchups are a grouping of deals comprising a sale deal for product A of brand X and a printable coupon deal for product A of brand X; or a sale deal for brand X and a Sunday paper coupon deal for product A of brand X, a Sunday paper coupon deal for product B of brand X, and an-store coupon deal for product C of brand X. In certain example embodiments, when the system does not find a matchup of deals but identifies a deal (a sale deal or a coupon deal) that corresponds to the user's search criteria, the system presents the identified deal to the user.

Based on the deal data received at the system (e.g., using a crawler), the system may identify or determine one or more deal attributes (characteristics) for each identified deal. Examples of such attributes are a title, a description, a term, a brand identification, a product identification, a deal type, a retailer identification, a data source, a valid-from date, a valid-to date, an image, a product category, or a product subcategory. An identification may be a name, a number, an image, or any suitable combination thereof.

Several of the deal attributes may be used by the system to determine whether a deal may be part of a matchup. If the system determines that a deal has a brand identification associated with it, then the deal is a matchable deal (may participate in a matchup). However, if no brand has been automatically identified for a particular deal, then the deal is considered to be non-matchable at that time. The system may flag such a deal for further analysis (e.g., by an administrator or by the system using another algorithm).

A matchup comprises a sale deal and at least a coupon deal that have overlapping validity periods that have not expired. In other words, to form a matchup, the two or more deals may have corresponding brand names (e.g., "Coca Cola®" and "Coca-Cola®", or "Coca-Cola®" and "Coke™"), the validity periods of the respective deals may have a period of time in common, and the deals may not have expired at the time of the matchup generation. A deal validity period is the time period between the earliest date and the last date a deal is in effect. Thus, in some example embodiments, the deal type attribute, the valid-from date attribute, and the valid-to date attribute are considered in determining whether a deal is a matchable deal (a candidate for a matchup).

Although more than one matchable coupon deals may be grouped with a matchable sale deal to form a matchup, in some example embodiments, the matchup may not have more than one matchable sale deals. It is to be noted that the sale deal in a matchup may include more than one brand names and the coupon deals in the matchup may be directed to the different brands included in the sale deal. For example, a store has a sale for Coca-Cola® and Orville® products. The system may determine that the sale deal includes two brand names: Coca-Cola® and Orville®. Also, the system may determine that the sale deal has not expired. To generate a matchup, the system may identify one or more coupon deals that include at least one of the Coca-Cola® or Orville® brands, or both, that have validity periods that overlap the sale deal validity period, and that have not expired.

In some example embodiments, other deal attributes are also used in determining whether deals can be matched to form a matchup. For example, a matchup may be generated based on matching the product names, retailer names, or the terms in a sale deal and a coupon deal.

As described above, in response to a user query, the system may identify a matchup of deals that corresponds to the user's search criteria based on the searched brand name or product name, or both. To identify a matchup for presentation to the user, the system may first determine whether the date of the user's search is before the earliest expiration date of any of the deals included in the matchup. In some example embodiments, the system may pre-generate the matchups before the user initiates the search request. In other example embodiments, the system may generate the matchups in response to receiving the search query from a user's machine.

As described above, the system may base the generating of matchups on data that pertains to sales offered, for example, by e-commerce or brick-and-mortar businesses, and discounts offered by manufacturers or retailers. In some example embodiments, a matchup is based on a sale deal published in a circular and a coupon deal, such as a Sunday paper coupon, an in-store (e.g., online or brick-or-mortar store) coupon or printable coupon. The system may receive deal data that pertains to a plurality of deals, including the sale deal published in the circular and the coupon deal. In some example embodiments, as described above, the deal data that pertains to a plurality of deals is received from one or more crawlers that browse the World Wide Web (or specific Uniform Resource Locators ("URLs")) according to a set of policies provided by the system. In certain example embodiments, the deal data that pertains to a plurality of deals may be received in one or more data feeds, or in one or more spreadsheets received from various data source operators (e.g., a product manufacturer or a retailer).

Upon receiving the deal data, the system may identify, based on the deal data, a first set of data that corresponds to the sale deal and a second set of data that corresponds to the coupon deal. The system may parse the deal data that pertains to a plurality of deals using a parser and identify a brand identification being present in a portion of the deal data. In certain example embodiments, the system first identifies the title or description of a deal and then determines one or more brand identifications based on the title or description of the deal, or both. Based on identifying the brand identification, the system may determine a first set of data (e.g., the portion) of the deal data that is associated with (corresponds to) the respective brand identification and a particular deal.

Based on the first set of data, the system may further determine other characteristics (or attributes) of the deal, such as a type of deal, a product type, a valid-from date, a valid-to date, a retailer, a data source, an image, a category of the product, or a subcategory of the product. Based on the valid-from date and valid-to date, the system may determine the validity period of a deal. Also, the system may determine that the deal data comprises more than one set(s) of data that are associated with a respective brand. In some example embodiments, based on examining one or more of the deal attributes present in each of the multiple sets of data, the system may determine whether the multiple sets of data describe the same deal. If the multiple sets of data that are associated with the respective brand are determined to correspond to the same deal, the system may determine that the multiple sets of data are duplicates of the same deal. The system may store the deal data of one of the duplicates and discard the others.

In some example embodiments, to identify brands within the deal data pertaining to a plurality of deals, the system parses the deal data, generates tokens based on the parsed deal data, and compares the resulting tokens (e.g., segments of text) to the contents of a brand dictionary that may be stored in a database. As such, tokenization may be one way to "comprehend" (or extract structured data from) the unstructured deal data received by the system (e.g., from a crawler or a data feed). Upon identifying a brand identification, in some instances, the system stores in a document oriented database a first set of deal data that includes the identified brand identification as part of a document that corresponds to a particular deal. The first set of deal data is stored in the document as a first plurality of key-value pairs, where each key includes a deal attribute and each value includes a portion of the deal data (or a token) that corresponds to a particular key. Examples of key-value pairs are "brand: Orville®", "type: sale", "type: online coupon", "valid-from: Mar. 10, 2013", etc. In some instances, a unique key "href" is generated upon the receipt of the deal data by combining and hashing a number of fields in the deal. The href key-value pair may be used during the duplicate detection process. In various example embodiments, the system may store the first set of deal data in a relational database.

In certain example embodiments, after receiving the deal data that pertains to a plurality of deals, the system may segment from the deal data, based on identifying within the deal data a sale brand identification and a sale type, a first set of data that corresponds to the sale deal. Based on identifying within the deal data a coupon brand identification and a coupon type, the system may segment from the deal data a second set of data that corresponds to the coupon deal. Then, the system may automatically determine, based on the first set of data, a sale valid-from date, a sale valid-to date, and a sale validity period that starts at the sale valid-from date and ends at the sale valid-to date. The system may also determine based on the second set of data, a coupon valid-from date, a coupon valid-to date, and a coupon validity period that starts at the coupon valid-from date and ends at the coupon valid-to date. Finally, the system may automatically generate a matchup of the sale deal and the coupon deal, including a sale deal description and a coupon deal description, based on matching the sale brand identification and the coupon brand identification, determining that the sale validity period and the coupon validity period have a common time period, and determining that the sale valid-to date and the coupon valid-to date have not passed (e.g., the sale deal and coupon deal have not expired).

In various example embodiments, upon receiving the deal data that pertains to a plurality of deals, the system dynamically detects that reward deal data are embedded (or included) within the deal data that pertains to a sale deal. The system, based on applying a rule for identifying or segmenting a portion of data, or both, may separate the reward deal data from the sale deal data. Based on the separated sale and reward deal data, the system may generate a matchup that includes the sale deal and the reward deal. In some instances, the matchup of the sale deal and reward deal may include additional deals, such as one or more coupons that are matchable with the sale deal.

In some example embodiments, upon receiving a query (e.g, a search request from a user), the system may, based on the query, identify and present the matchup as part of a user interface of a search application. The interface may include at least one of a visual representation of the sale deal and the coupon deal, the sale deal description and the coupon deal description, a matchup list container to store the matchup, a first interface portion to initiate sharing the matchup, or a second interface portion to initiate the transmittal of a communication pertaining to the matchup. In certain example embodiments, after receiving the query, the system may generate, based on parsing the query, a query keyword token. Then, the system may identify a matchup (from a plurality of matchups) based on determining that the query keyword token corresponds to at least one of a matchup brand (a sale deal brand or a coupon deal brand), a product identification, a product category, or a product subcategory included in the matchup, and based on determining that the sale valid-to date and the coupon valid-to date have not passed. Upon identifying the matchup, the system may display the matchup in response to the query.

In some example embodiments, the system may provide a user the choice to automatically receive sales, coupon, and matchup alerts for the stores, brands, or products preferred by the user. The user may provide the system the identifications of one or more "favorites", such as brand names, categories of products, or stores, about which the user is interested to receive sale and discount notifications. In some example embodiments, the system may periodically (e.g., hourly, daily, or weekly) communicate recently announced sales, new coupons, and new matchups to a user based on the list of favorites provided by the user. Alternately, or additionally, the system may notify the user of new sales, discounts, or matchups as soon as the system identifies the new deals or matchups. This information, directed to enhancing a user's shopping experiences and to saving the user money, may be presented as part of a personal circular (also a "pircular").

A pircular may be a tool (e.g., an application) that includes a variety of information that may assist a user in his shopping activities and may save the user money. In certain example embodiments, a pircular may be designed to be an electronic wallet that automatically accumulates sale, coupon, and matchup information based on user-specified preferences. The pircular may function as an organizer for sale deals, coupon deals, and matchups of deals. The user may access the user's pircular, for example, using a mobile device and without resorting to a browser. However, in some instances, after searching for matchups using a browser, the user may choose to forward the presented matchups to the user's pircular. Alternately, the system may automatically forward the presented matchups to the user's pircular.

The pircular may be accessed by the user in a variety of ways. In some example embodiments, the pircular is displayed as part of a mobile application (e.g., on the user's mobile phone). Alternately, or additionally, the system periodically may send the user's pircular comprising new deals or matchups to the user's email address. Further, the user may access his pircular, for instance, to view the list of sales, coupons, and matchups accumulated in the pircular, when the user is browsing a web site provided by the system. In other words, the pircular is a tool that a user can access from anywhere, whether using a browser or a mobile application.

In some example embodiments, in addition to a list of sales, coupons, and matches, the pircular displays the user's shopping list. The system may send the user a geolocation alert based on determining that the user is in a certain pre-determined proximity to a store that is on the user's favorites list and based on determining that the user's pircular comprises at least one of a sale, coupon, or matchup applicable to the respective store. In other words, if the user is in the vicinity of a favourite store that has an active sale, the system may send the user a pircular notification about the active sale at the particular store. Also, if the user's pircular comprises a coupon or matchup that may be used in the favourite store, the system may notify the user of such a coupon or matchup. Furthermore, in some example embodiments, if the system determines that an item on the user's shopping list corresponds to (e.g., matches) a brand or product included in a sale deal, coupon deal, or matchup deal comprised in the user's pircular, the system may send a communication (e.g., an alert) to the user notifying him of such a match.

In certain example embodiments, when the system may not identify a matchup that corresponds to a user's search criteria, the system may store the user's search criteria and automatically execute new searches on behalf of the user as new deal data is received. Once a matchup that matches the user's search criteria is generated, the system may communicate (e.g., transmit) the matchup data to the user's pircular. The system may also alert the user to a new matchup being received in the user's pircular.

Furthermore, the system may direct the user's pircular to expunge sale deals, coupon deals, or matchups from the lists of sales, coupons, or matchups as soon as the respective deals expire. Thus, at any point in time, the pircular may present to the user only valid, non-expired deals that are pertinent to the user's preferences (e.g., based on the list of favorites). An example pircular user interface is described below with respect to FIG. 9.

FIG. 1 is a network diagram illustrating various functional components of a discount matching system with a rules engine, consistent with some example embodiments, for use with a wide variety of applications, and specifically for automatically generating combinations of sale deals and coupon deals based on automatically identifying matching brands and overlapping and non-expired validity periods of the sale deals and the coupon deals. The network diagram of FIG. 1 depicts a client-server system 100 within which various example embodiments may be deployed. A networked system 102 provides server side functionality via a network 140 (e.g., the Internet or Wide Area Network (WAN)) to one or more clients. For example, FIG. 1 illustrates a programmatic client 128 and a web client 130 (e.g., a browser) executing on respective client machines 132 and 134.

An Application Program Interface (API) server 124 and a web server 126 are coupled to, and provide programmatic and web interfaces respectively to, one or more application servers 120. The application servers 120 host one or more matching applications 122. The matching applications 122 host a matching component 142. The application servers 120 are, in turn, shown to be coupled to a database server 136 that facilitates access to a database 138.

The matching applications 122 may provide a number of matching functions and services to users that access the networked system 102. In various example embodiments, the matching applications 122 may include a matching component 142. The matching component 142, in some example embodiments, may identify sale deals and coupon deals that may be matched, and may generate matchups of sale deals and coupon deals. In some example embodiments, one or more crawlers 118 may be used to communicate with and receive deal data from various deal data sources via a network 104 (e.g., the Internet or Wide Area Network (WAN)). Examples of deal data sources are one or more circular provider systems 112, manufacturer systems 114, and retailer systems 116. With the user of the one or more crawlers 118 deal data may be gathered about available sale deals and shopping discounts, such as coupon deals, etc. The crawlers 118 may be programmed to access sources of information (e.g., web sites) about available shopping discounts hosted by the circular provider systems 112, the manufacturer systems 114, and the retailer systems 116, and collect certain portions of the available deal data. For example, the crawlers 118 may capture sale and coupon data 106, 108, and 110, data about product brands on sale, category and subcategory data included on the respective web sites of the circular provider systems 112, the manufacturer systems 114, and the retailer systems 116. The captured deal data may be stored in database 138. In other example embodiments, the deal data may be received via data feeds or may be provided in spreadsheets (e.g., by the operators of the circular provider systems 112, the manufacturer systems 114, and the retailer systems 116).

A matching application 122 may receive a request to present a matchup based on provided input. The request or the input, or both, may be received, in some example embodiments, from a human user or from a bot (e.g., a software application that may run an automated task on behalf of a user) based on a predefined rule. In certain example embodiments, the matching component 142 may respond to a matchup search query by identifying and presenting a matchup of a sale deal and a coupon deal. The matchup may, for instance, be displayed in an interface of the programmatic client 128 or web client 130.

The web client 130 accesses the various matching applications 122 via the web interface supported by the web server 126. Similarly, the programmatic client 128 accesses the various services and functions provided by the matching applications 122 via the programmatic interface provided by the API server 124.

Further, while the system 100 shown in FIG. 1 employs a client-server architecture, the present invention is of course not limited to such an architecture, and could equally well find application in a distributed, or peer-to-peer, architecture system, for example. The various matching applications 122 could also be implemented as standalone software programs, which do not necessarily have networking capabilities.

Figure 2:
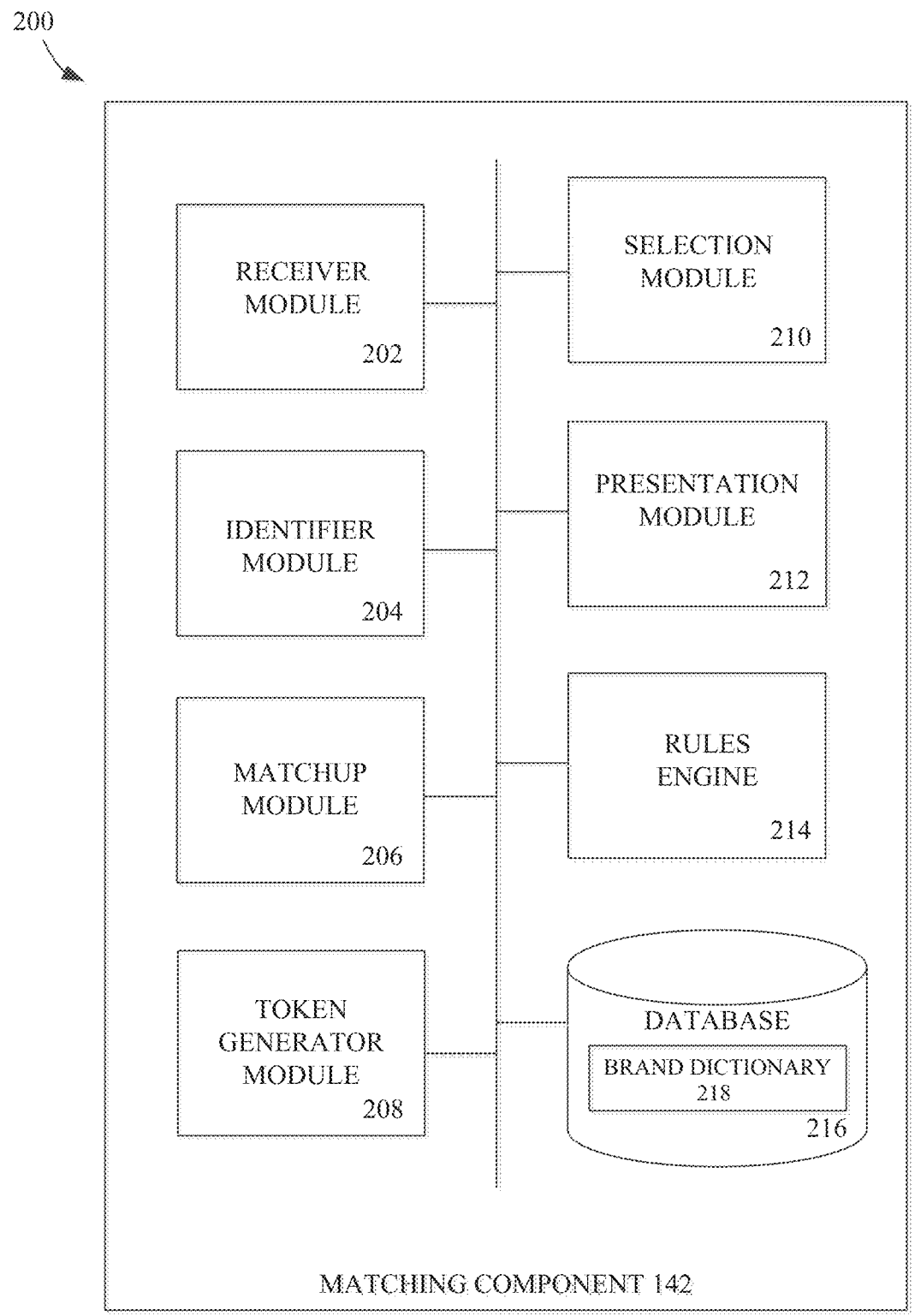
FIG. 2 is a block diagram of certain modules of an example system for automatically matching sale deals and coupon deals, consistent with some example embodiments.

FIG. 2 is a block diagram of certain modules of an example system for automatically matching sale deals and coupon deals, consistent with some example embodiments. Some or all of the modules of system 200 illustrated in FIG. 2 may be part of the matching component 142. As such, system 200 is described by way of example with reference to FIG. 1.

The system 200 is shown to include a number of modules that may be in communication with each other. One or more modules of the system 200 may reside on a server, client, or other processing device. One or more modules of the system 200 may be implemented or executed using one or more hardware processors. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. In some example embodiments, one or more functions described herein may be performed by a crawler 118 or an API.

In some example embodiments, one or more of the depicted modules are implemented on an application server 120. In FIG. 2, the matching component 142 is shown as including a receiver module 202, an identifier module 204, a matchup module 206, a token generator module 208, a selection module 210, a rules engine 214, and a database 216 configured to communicate with each other (e.g., via a bus, shared memory, or a switch). The database 216 may comprise a brand dictionary 218.

A receiver module 202 is configured to receive deal data that pertains to a plurality of deals. The plurality of deals may include a sale deal published in a circular and a coupon deal. The plurality of deals may be received from the crawlers 118 which are programmed to download and analyse data that pertains to shopping bargains. The crawlers 118 may receive the deal data that pertains to the plurality of deals from a variety of data sources, such as one or more web sites that publish weekly advertising circulars (e.g., hosted by the circular provider systems 112), one or more web sites that may publish manufacturer product discounts (e.g., hosted by the manufacturer systems 114), or one or more web sites that advertise bargains offered by online or brick-and-mortar stores (e.g., hosted by the retailer systems 116). The deal data received using a crawler 118 may be unstructured (e.g., in the form of HTML text). The unstructured deal data may include both content information (e.g., a sale for all the products of brand A at a particular retailer X occurring during a particular period of time) and context information (e.g., categories and subcategories to which the respective products belong). The system may process the unstructured deal data and transform it into (or extract) structured deal data before matchups of sale deals and coupon deals are generated. The unstructured data received using the crawler 118 and/or structured deal data may be stored in one or more records comprised in the database 216.

In some example embodiments, instead of being received from a crawler 118, the deal data that pertain to the plurality of deals may be received in the format of a spreadsheet comprising deal data (e.g., from a record in database 138) or from a data feed. A data feed may or may not provide structured data.

An identifier module 204 is configured to identify a first brand identification and a second brand identification based on the deal data. The identifier module 204 is also configured to determine, based on the deal data, a first set of deal data that includes the first brand identification and corresponds to the sale deal, and a second set of deal data that includes the second brand and corresponds to a coupon deal.

The identifier module 204 is further configured to determine, based on the first set of data, a first plurality of key-value pairs, each key-value pair including an attribute that describes a characteristic of the sale deal and a value of the attribute, each key-value pair identifying one of the sale brand identification, the sale deal type, and at least one of a sale product identification, a sale retailer identification, a sale data source, a sale deal title, the sale deal description, a sale deal term, a sale valid-from date, a sale valid-to date, an image, a sale product category, or a sale product subcategory as attributes of the sale deal. Further, the identifier module 204 may generate a sale deal document that includes the first plurality of key-value pairs. The sale deal document may be stored in the database 216.

The identifier module 204 may also determine, based on the second set of data, a second plurality of key-value pairs, each key-value pair including an attribute that describes a characteristic of the coupon deal and a value of the attribute, each key-value pair identifying one of the coupon brand identification, the coupon deal type, and at least one of a coupon product identification, a coupon retailer identification, a coupon data source, a coupon deal title, the coupon deal description, a coupon deal term, a coupon valid-from date, a coupon valid-to date, an image, a coupon product category, or a coupon product subcategory as attributes of the coupon deal. Further, the identifier module 204 may generate a coupon deal document that includes the second plurality of key-value pairs. The coupon deal document may be stored in the database 216.

In certain example embodiments, the receiver module 202 is further configured to assert a value of an attribute of one of the first plurality of key-value pairs based on applying an assertion rule that corresponds to the particular attribute (of the sale deal data). The identifier module 204 is further configured to validate the asserted value of the attribute based on identifying a correspondence e.g., a similarity or a match) between the asserted value and at least a portion of the sale deal data. Similarly, the receiver module 202 is further configured to assert a value of an attribute of one of the second plurality of key-value pairs based on applying an assertion rule that corresponds to the respective attribute (of the coupon deal data). The identifier module 204 is further configured to validate the asserted value of the attribute based on identifying a correspondence (e.g., a similarity or a match) between the asserted value and at least a portion of the coupon deal data.

For example, in the context of a web crawler performing one or more functions of one or more modules of the system (e.g., the receiver module 202), the web crawler 118 process may make one or more assertions about the values of certain attributes of a deal (e.g., title, description, terms, validFrom, or validTo). An assertion is a presupposed (e.g., guessed or presumed) value that requires validation (e.g., confirmation based on comparison to the actual deal data) to be considered the actual (e.g., correct) value of an attribute. The attribute values for which assertions are made are values which are not explicitly "known" to the system at the time of the crawl. To illustrate, if a web crawler crawls the coupon site of Retailer A to access (e.g., obtain) Retailer A's coupon deal data, the attribute values that correspond to the attributes "Retailer Identification" and "Deal Type" are facts known to the system: "Retailer A" and "in-store coupon", respectively. However, the values of other types of deal attributes may not be known to the system. Thus, possible values for each of the title, description, terms, valid-from, and valid-to attributes are asserted during the crawl based on applying one or more assertion rules that correspond to the particular attribute. In certain example embodiments, the assertion rules are included in the rules that govern the crawler (or the API, in the context of assertions being performed by an API). Then, for each attribute not explicitly known at the time of the crawl, the identifier module 204 may validate the asserted value based on identifying a correspondence between the asserted value and at least a portion of the received (e.g., crawled) deal data. The asserted value may be validated, for instance, when the asserted value is compared against a set of deal data and a match is found between the asserted value and a portion of the deal data.

The identifier module 204, upon determining that a particular attribute (e.g. the title) is not yet validated, may request the API or the crawler (or the receiver module 202, or may itself utilize the assertion-validation functions) to determine whether data about a reward deal is embedded within the sale deal data. The API or crawling process asserts one or more values for each attribute based on the rules of the API or crawler. Then, the identifier module 204 validates a new set of values for the reward deal. As a result, the description that was asserted during the API or crawling process may be split into two strings: the description of the sale deal and, for example, the title of the reward deal. If no reward deal data is determined to be embedded in the sale deal data, the identifier module 204 validates the value transmitted by the crawler or the API. The identifier module 204 may store each attribute and the validated value that corresponds to the particular attribute as a key-value pair in the database 216.

A matchup module 206 is configured to generate, using a processor, a matchup of the sale deal and the coupon deal based on matching the sale brand identification and the coupon brand identification, detecting an indication of a sale deal type in the first set of deal data and an indication of a coupon deal type in the second set of data, and determining that a sale deal validity period and a coupon validity deal period overlap and have not expired. The sale deal validity period may be calculated based on the first set of deal data and the coupon deal validity period may be calculated based on the second set of deal data. The matchup may include a sale deal description and a coupon deal description. According to some example embodiments, the matching of the sale brand identification and the coupon brand identification may include determining that a sale brand name included in the sale deal and a coupon brand name included in the coupon deal are synonyms.

In certain example embodiments, the identifier module 204 is further configured to identify a sale retailer identification for the sale deal and a coupon retailer identification for the coupon deal. The matchup module 206 may further base the generating of the matchup on matching the sale retailer identification and the coupon retailer identification.

The identifier module 204 may, according to some example embodiments, be further configured to identify a sale product identification for the sale deal and a coupon product identification for the coupon deal. The matchup module 206 may further base the generating of the matchup on matching the sale product identification and the coupon product identification.

In some example embodiments, upon the receiver module 202 receiving the deal data that pertains to a plurality of deals, the identifier module 204 is configured to segment from the deal data, based on identifying within the deal data a sale brand identification and a sale deal type, a first set of data that corresponds to the sale deal and, based on identifying within the deal data a coupon brand identification and a coupon deal type, a second set of data that corresponds to the coupon deal. The identifier module 204 is also configured to determine, based on the first set of data, a sale valid-from date, a sale valid-to date, and a sale validity period that starts at the sale valid-from date and ends at the sale valid-to date, and, based on the second set of data, a coupon valid-from date, a coupon valid-to date, and a coupon validity period that starts at the coupon valid-from date and ends at the coupon valid-to date. The matchup module 206 is configured to generate, using a processor, a matchup of the sale deal and the coupon deal including a sale deal description and a coupon deal description based on matching the sale brand identification and the coupon brand identification, determining that the sale validity period and the coupon validity period have a common time period, and determining that the sale valid-to date and the coupon valid-to date have not passed.

A token generator module 208 is configured to parse the deal data and generate, based on the parsing of the deal data, a plurality of tokens including a sale brand token and a sale keyword token. In some example embodiments, the system parses the deal data, identifies and generates token(s) for the title or description of a deal, and then determines one or more brand identifications based on the title token or the description token, or both. The identifying (or determining) of the sale brand identification may comprise identifying a brand name included in the sale deal based on the sale brand token and a brand dictionary. The determining of the sale validity period includes identifying, using the keyword token, a sale valid-from date and a sale valid-to date, and calculating the sale validity period starting at the sale valid-from date and ending at the sale valid-to date. The token generator module may also receive a query, parse the query, and generate, based on the parsed query, a query keyword token. The query may be a search query issued by the programmatic client 128 or the web client 130 of a user who initiated a matchup search request using the client machine 132 or client machine 134, respectively.

A selection module 210 is configured to identify the matchup based on determining that the query keyword token corresponds to at least one of a sale brand identification, a coupon brand identification, a product identification, a product category, or a product subcategory included in the matchup. The selection module 210 is also configured to determine that the sale valid-to date and the coupon valid-to date of the sale and coupon deals included in the matchup have not passed. By verifying that the sale and coupon valid-to dates have not passed, the selection module 210 identifies only matchups that are still valid and applicable to the particular search query.

A presentation module 212 is configured to present the identified matchup in response to the query. Upon the selection module 210 identifying a matchup that corresponds to the received search query, the presentation module 212 may present the matchup as part of a user interface of a search application. The user interface may include at least one of a visual representation of the sale deal and the coupon deal, the sale deal description and the coupon deal description, a matchup list container to store the matchup, a first interface portion to initiate sharing the matchup, or a second interface portion to initiate the transmittal of a communication pertaining to the matchup. Examples of the user interfaces are further described with respect to FIGS. 5-9.

A rules engine 214 is configured to generate assertion rules that correspond to particular attributes. In certain example embodiments, the system may identify the markup constraints (e.g., the format, structure, or fields) of a deal by a particular retailer. Based on the identified markup constraints, the rules engine 214 may determine the attributes that characterize a deal by the particular retailer. The rules engine 214 may also generate one or more assertion rules for each of the deal attributes. An assertion rule may govern the type of value the system may assert with respect to a particular attribute in order to identify the actual value that corresponds to the particular attribute from within the deal data. Using assertions generated based on one or more assertion rules, the system may validate one of a number of guessed values as the actual value that corresponds to a particular deal attribute, as described above. The identification (e.g., extraction from the raw HTML data) of the actual values corresponding to particular deal attributes allows the system to structure the received unstructured deal data (e.g., into key-value pairs). The assertion rules may be stored in a database of assertion rules. Furthermore, the assertions generated using one or more assertion rules may be stored in a database of assertions.

The rules engine 214 may also determine which one of a number of assertions for a particular attribute results in the identification of the correct value for the particular attribute. In certain example embodiments, the rules engine 214 may generate a spreadsheet including the assertions from the database of assertions (or the assertion rules, or both) and present it in a user interface (e.g., to be used by an administrator of the system).

As described above, the database 216 may store the deal data in its original, unstructured format. Structured data (e.g., tokens stored as part of key-value pairs) may also be stored in the database 216. The database 216 may include the brand dictionary 218 that comprises brand identifications (e.g., brand names and synonyms). In some instances, the brand names are received from trusted providers (e.g., deal data providers 112, 114, or 116) via an API call. For deal data received from trusted providers, the system trusts the fact that the brand name provided is a real brand name that may be added to the brand dictionary 218. This allows the contents of the brand dictionary 218 to grow and become more comprehensive without manual intervention. In some example embodiments, the system provides an administrator tool to facilitate manual entering of brand names (e.g., in the case of the flagged deals, described above).

However, there are instances when the received brand names may be blocked from being considered for matchups. For example, if the brand "5" associated with certain chewing gum products were stored in the brand dictionary 218, then every deal that contains a "5" may be deemed a matchable deal based on comparing the deal data with the contents of the brand dictionary 218. Because allowing the brand name "5" in the brand dictionary 218 contributes to generating a large number of invalid matchups, the system (or the administrator) may choose to remove brand name "5" from the brand dictionary 218 and block this brand name from being added back to the brand dictionary 218.

In some example embodiments, the selection module 210 is configured to receive at least one of a brand identification, a store identification, a product identification, or a product category identification and to generate a favorites list that includes the at least one of the brand identification, the store identification, the product identification, or the product category identification. The selection module 210 is further configured to identify, using the favorites list, a matchup of a sale deal and a coupon deal based on determining, using at least one computer processor, that the at least one of the brand identification, the store identification, the product identification, or the product category identification corresponds to a portion of deal data that pertains to the matchup. The presentation module 212 is further configured to present the matchup as part of a personal circular (a "picular"), the personal circular including a user interface that displays at least one of a shopping list, a sale deal, a coupon deal, the matchup, or the favorites list.

Any two or more of these modules may be combined into a single module, and the functions described herein for a single module may be subdivided among multiple modules. Furthermore, according to certain example embodiments, the modules described herein as being implemented within a single machine, database, or device may be distributed across multiple machines, databases, or devices.

Figure 3:
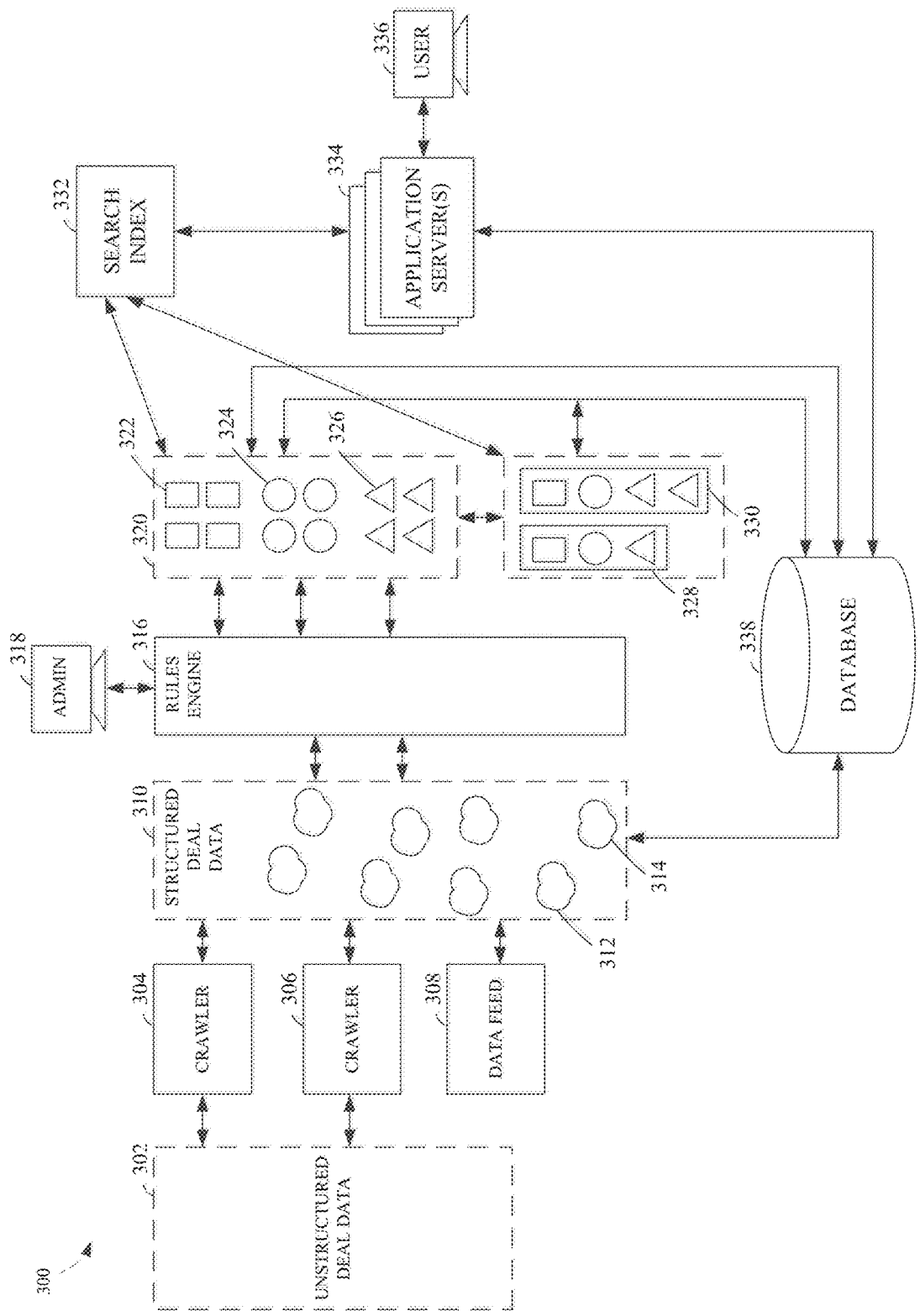
FIG. 3 is a block diagram illustrating the flow of data that occurs when performing various portions of a method for automatically matching sale deals and coupon deals, consistent with some example embodiments.

FIG. 3 is a block diagram illustrating the flow of data that occurs when performing various portions of a method for automatically matching sale deals and coupon deals, consistent with some example embodiments.

In some example embodiments, the matching component 142 may receive deal data (e.g., unstructured deal data 302) via crawlers 304 and 306. In certain example embodiments, the deal data may be received from a data feed 308 or a spreadsheet. The crawlers 304 and 306 may be programmed to capture (e.g., download) data about shopping deals from certain sources of deal data, for example, one or more web sites of the circular provider systems 112, manufacturer systems 114, or retailer systems 116. The identifier module 204 may identify, based on the received unstructured deal data 302, a brand identification and may determine that a first set of deal data. (e.g., a certain portion of the received unstructured deal data 302) corresponds to (or includes) the brand identification. The identifier module may store the brand identification as part of a key-value pair 312 in a brand dictionary, for example, hosted by database 338. The identifier module 204 may also store a part of or the entire first set of the deal data as part of another key-value pair 314 in the database 338. The key value pairs 312 and 314 are stored in the database 338 as part of a document that is associated with (or pertains to) the brand identification or the first set of deal data, or both.

Other characteristics (or attributes) descriptive of a deal may be extracted from the first set of deal data and stored in the database 338 as part of hey-value pairs of the document. Examples of key-value pairs are "deal type: sale", "retailer: Walgreens", and "source: Shoplocal.com". The key-value pairs derived from the unstructured deal data 302 or from the data feed 308, including key-value pairs 312 and 314, may be considered to be structured deal data 310. In some example embodiments, the unstructured deal data 302 is structured using assertions generated based on assertion rules provided by the rules engine 316.

The rules engine 316 may generate assertion rules based on one or more constrains identified with respect to particular deals by particular deal providers (or sources). Alternately or additionally, assertion rules may be received from administrator 318 who, in some instances, may monitor and adjust the assertions to better structure the deal data. Examples of assertions (e.g., guessed values of attributes) are "The title is 'Buy one, get one free'" or "The title is 'Christmas sale'." The receiver module 202 may assert a guessed value of a particular attribute of a deal based on applying an assertion rule that corresponds to the particular attribute. After the assertion is made, the identifier module 204 may validate the asserted guessed value of the particular attribute based on identifying a correspondence between the asserted guessed value and at least a part of the respective deal data.

In some example embodiments, the rules engine 316 may also cause the structured deal data 310 to conform to a particular format as a result of applying normalization rules against the structured deal data 310. Based on normalizing the structured deal data 310, the rules engine 316 generates normalized deal data 320. The normalized deal data 320 may be separated into deals, such as sale deals 322, online coupons 324, or printable coupons 326. Each of the sale deals 322, online coupon deals 324, and printable coupons 326 includes at least the following fields: title, description, terms, valid-from, and valid-to. The sale deals 322 and the coupon deals 324 and 326 may be stored in the database 338.

Upon the system structuring the deal data, according to some example embodiments, the matchup module 206 generates matchups including a sale deal 322 and one or more coupon deals 324 or 326 based on one or more deal matching rules generated and maintained by the rules engine 316. The deal matching rules are generated by the rules engine 316 according to one or more matching criteria (e.g., provided by the administrator of the system). A deal matching rule may specify the values of which fields of the sale deal 322 and online coupon deal 324 or printable coupon deal 326 may be compared to determine if a correspondence between the respective values exists (e.g., if the values match). If the values of the corresponding fields of a sale deal 322 and a coupon deal 324 or 326 match, then the sale deal 322 and the coupon deal 324 or 326 are identified as "matchable" deals by the rules engine 316. To generate a matchup of the matchable deals, the matchup module 206 may match at least the brand identifications of the deals (e.g., the sale brand identification and the coupon brand identification), determine that one of the possible matchable deals is of the sale deal type and the one or more other deals are of the coupon deal type, and determine that a sale deal validity period and a coupon validity deal period overlap and have not expired. The matching component 122 may calculate the sale deal validity period based on the sale deal valid-from field and the sale deal valid-to field, and the coupon validity period based on the coupon deal valid-from field and the coupon deal valid-to field. The generated matchups may be stored in the database 338.

A user 336 may issue a search request for a deal matchup via an application server 334. The search request may include one or more search criteria, such as a brand name or a product name. The application server 334 may forward the user's query to a search index 332 (e.g., the selection module 210) to identify a matchup that corresponds to the search criteria comprised in the query. The search index 332 may communicate the search criteria to the token generator module 208 to parse the data of the search criteria and generate one or more query keyword tokens. In some example embodiments, the token generator module 208 may also generate deal data tokens based on the unstructured deal data 302 or the structured deal data 310. Then, the text in the query keyword tokens may be compared against the text in the deal data tokens during the process of selecting a matchup that corresponds to the user's search criteria.

In certain example embodiments, the selection module 210 may identify a matchup that meets the query criteria based on determining that the query keyword token corresponds to at least one of a sale brand identification, a coupon brand identification, or a product identification included in the matchup, and may determine that the sale valid-to date and the coupon valid-to date have not passed. Upon the selection module 210 identifying the matchup, the presentation module 212 may present the matchup (e.g., to the application server 334) in response to the query. The application server 334 may forward the matchup to the machine of the user 336.

According to some example embodiments, an administrator 318 may monitor the receipt of the deal data and the operation of the system, including the rules engine 316, using an administrator user interface. The administrator user interface may include a deal segmentation page that allows the administrator to see how the deal data that pertains to a particular deal is structured and normalized and to determine the status of the currently active (e.g., non-expired) deals.

For example, a deal may be identified as "searchable", "matchable", or "matched" by the rules engine 316 based on one or more deal status rules. If the rules engine 316 deems a deal to be searchable, then it may appear in search results presented in response to a search query (e.g., by a user). A deal may be considered searchable if the deal has a brand name associated with (e.g., included in) it and it has not expired. In certain example embodiments, a deal may be considered searchable if a particular set of attributes of the deal have corresponding validated values as part of the plurality of key-value pairs associated with the respective deal. In some example embodiments, the engine rule 316 may consider a coupon deal to be non-searchable unless it is matched to a sale deal. As such, a non-searchable coupon deal may not be presented to a user unless it is part of a matchup.

As described above, a matchable deal is a deal that includes a brand identification. If a brand identification is not automatically detected in the deal data, the system may allow the administrator 318 to analyse and manually edit or add to the deal data that pertains to unmatchable deals using the administrator user interface. In some instances, the administrator may manually change the status of a deal (e.g., from unmatchable to matchable) based on providing a corresponding brand identification. The changes provided by the administrator to the deal data may be received as input by the brand dictionary 218 and the rules engine 316. A matched deal is a deal that is a matchable deal that may be matched to another deal based on the matchup rules of a particular example embodiment.

Furthermore, if a deal is searchable, then the rules engine 316 may identify the brand of the respective searchable deal as an "active brand". For example, if a deal becomes searchable, then the fact of the brand of the searchable deal being active is logically inserted (by a rule) into the rules engine 316. Maintaining a knowledge base of the active brands allows the rules engine 316 to respond to a request to provide a list of active brands to be displayed to a user searching for deals or matchups of sale deals and coupon deals. Furthermore, the logical insertion of a fact allows the rules engine 316 to keep track of which rule inserted the respective fact. When the respective rule is no longer true, the rules engine 316 automatically retracts all the facts that were inserted by the respective rule. For example, once a valid-to date of a deal passes, then the deal is no longer searchable and the "searchable" fact is retracted; then the brand of the non-searchable deal is no longer searchable and the "active brand" fact is retracted; then the non-searchable deal is no longer matchable and the "matchable" fact is retracted; and then the unmatchable deal is no longer a matchup and the "matchup" fact is retracted. This process runs as part of the rules engine 316 and is utilized, for example, to provide accurate search results in response to search queries for deals and matchups of deals.

In some example embodiments, upon a rule logically inserting a fact into the knowledge base of the rules engine 316, the rules engine 316 automatically populates the search index 332 with the respective fact and manages it. Thus, the rules engine 316 retracts facts from the search index 332 in response to the corresponding rules in the rules engine 316 becoming false. This process allows for a more efficiently functioning matching component 142.

Figure 4:
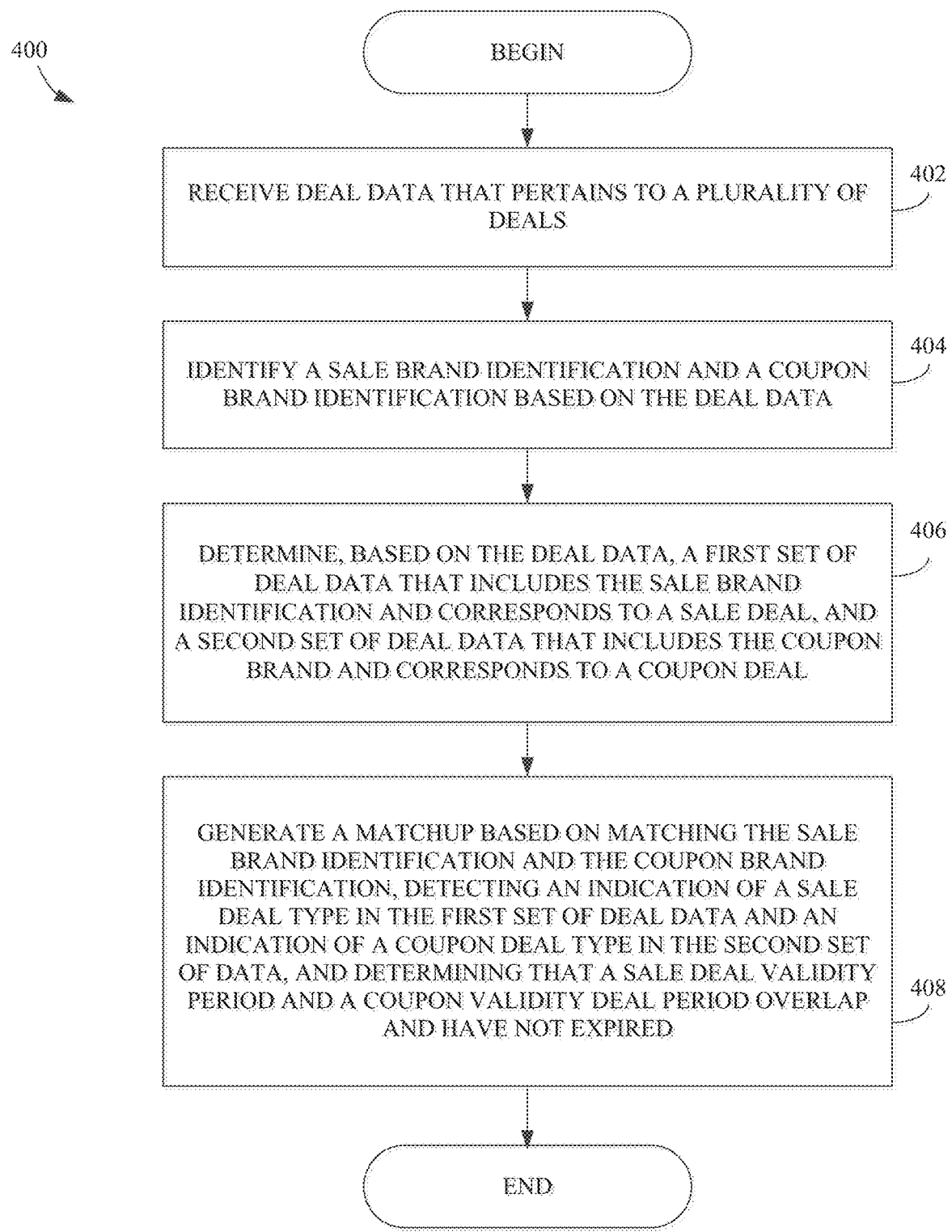
FIG. 4 is a flow diagram illustrating method steps involved in a method for automatically matching sale deals and coupon deals, consistent with some example embodiments.

FIG. 4 is a flow diagram illustrating method steps involved in a method for automatically matching sale deals and coupon deals, consistent with some example embodiments. The method 400 may be performed, in some example embodiments, by the various module of the matching component 142 discussed above with reference to FIG. 2.

Consistent with some example embodiments, the method begins at method operation 402, when the matching component 142 receives deal data that pertains to a plurality of shopping deals or bargains. The plurality of deals may include a sale deal and a coupon deal. The sale deal may be listed (e.g., published) in a circular publication, for example, a weekly publication that advertises one or more sales at a retailer. The coupon deal may be any one of a number of various types of discounts (e.g., a printable coupon, an in-store coupon, an online coupon, a Sunday Paper coupon, a store rewards discount, a cash discount, a volume discount, a combination discount, etc.)

Next, at method operation 404, the matching component 142 identifies a sale brand identification and a coupon brand identification based on the deal data. In some example embodiments, the matching component 142 identifies one or more brands in the deal data based on comparing one or more portions of the deal data (e.g., text) against the values included in the brand dictionary 218 stored in, for example, the database 216. The matching component may, in certain example embodiments, parse the deal data, generate one or more tokens based on the parsed deal data, and match the one or more tokens with the contents of the brand dictionary 218. For example, the matching component 142 may compare a token with a data record included in the brand dictionary 218 to determine if the token comprises a brand identification (e.g., a brand name). In some example embodiments, the matching component 142 may identify a brand identification based on matching a token with a record in a brand synonym dictionary. For example, by comparing the token "Coke._" generated based on the deal data with the records of the brand synonym dictionary and determining that "Coke._" is a synonym of "Coca-Cola._", the matching component 142 may identify that the deal data includes data about a deal for the Coca-Cola® brand (and one or more of the Coca-Cola® products).

In some example embodiments, the matching component 142 may also determine the type of deal that pertains to the identified brand identification based on detecting a deal type indication in a portion of the deal data that includes the brand identification. For example, the matching component 142 may detect that a first portion of the HTML text that comprises the brand identification for Coca-Cola® also comprises a deal type indication showing that the deal is of a sale type. In another example, the matching component 142 may detect that a second portion of the HTML text that comprises the brand identification for Coca-Cola® comprises a deal type indication showing that the deal is of a coupon type.

At method operation 406, the matching component 142 determines, based on the deal data and the sale brand identification, a first set of deal data that includes the sale brand identification and corresponds to the sale deal. Also, the matching component 142 determines, based on the deal data and the coupon brand identification, a second set of deal data that includes the coupon brand and corresponds to the coupon deal.

In some example embodiments, the matching component 142 may determine, based on the first set of data, a first plurality of key-value pairs including the sale brand identification, the sale deal type, and at least one of a sale product identification, a sale retailer identification, a sale data source, a sale deal title, a sale deal description, a sale deal term, a sale valid-from date, a sale valid-to date, an image, a sale product category, or a sale product subcategory as attributes of the sale deal. Based on determining the first plurality of key-value pairs, the matching component 142 may generate a sale deal document that includes the first plurality of key-value pairs. The matching component 142 may also determine, based on the first set of data, a second plurality of key-value pairs including the coupon brand identification, the coupon deal type, and at least one of a coupon product identification, a coupon retailer identification, a coupon data source, a coupon deal title, a coupon deal description, a coupon deal term, a coupon valid-from date, a coupon valid-to date, an image, a coupon product category, or a coupon product subcategory as attributes of the coupon deal. Based on determining the second plurality of key-value pairs, the matching component 142 may generate a coupon deal document that includes the second plurality of key-value pairs.

Next, at method operation 408, the matching component 142 generates a matchup based on matching the sale brand identification and the coupon brand identification, based on detecting an indication of a sale deal type in the first set of deal data and an indication of a coupon deal type in the second set of data, and based on determining that a sale deal validity period and a coupon validity deal period overlap and have not expired. The determining of the sale validity period may include identifying, based on the first set of deal data, a sale valid-from date and a sale valid-to date, and calculating the sale validity period starting at the sale valid-from date and ending at the sale valid-to date. The determining of the coupon validity period may include identifying, based on the second set of deal data, a coupon valid-from date and a coupon valid-to date, and calculating the coupon validity period starting at the coupon valid-from date and ending at the coupon valid-to date.

In some example embodiments, the matching component 142 may identify, based on the deal data, a sale retailer identification for the sale deal and a coupon retailer identification for the coupon deal. The matching component 142 may further base the generating of the matchup on matching the sale retailer identification and the coupon retailer identification. The matching of the sale and deal retailer identifications may include determining that the sale retailer identification corresponds to the coupon retailer identification or vice versa.

In certain example embodiments, the matching component 142 may identify, based on the deal data a sale product identification for the sale deal and a coupon product identification for the coupon deal. The matching component 142 may further base the generating of the matchup on matching the sale product identification and the coupon product identification. The matching of the sale and deal product identifications may include determining that the sale product identification corresponds to the coupon product identification or vice versa.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment, or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 5:
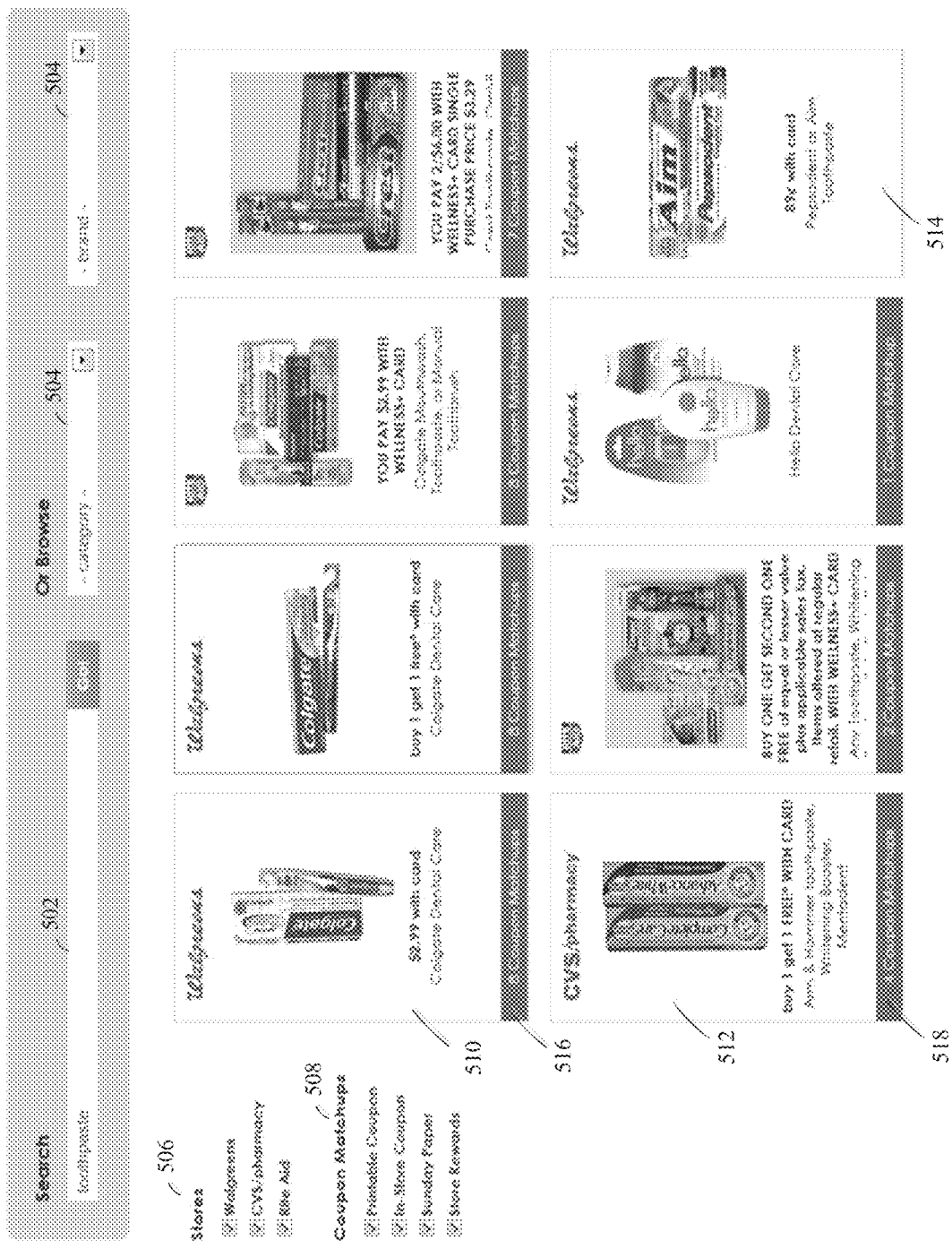
FIGS. 5-9 are example portions of user interfaces for providing matchups of sale deals and coupon deals, consistent with some example embodiments.

FIGS. 5-9 are example portions of user interfaces for providing matchups of sale deals and coupon deals, consistent with some example embodiments. FIG. 5 illustrates, for example, a portion of a matchup interface 500 that displays results of a search for matchups. In some example embodiments, the matchup interface 500 includes a search field 502 where a user may enter one or more search criteria (e.g., the text "toothpaste" representing a product name). The matchup interface 500 also presents the user with a category drop-down menu 504 to facilitate browsing products by category or subcategory, or both, and a brand drop-down menu 504 to facilitate browsing products by brand name.

Also, the matchup interface 500 includes one or more names of stores 506 from which a user may choose one or more retailers whose deals the user is interested in. Further, the matchup interface 500 includes one or more coupon matchups 508 that represent types of coupons the user may select to be included in the presented matchups.

Upon the system executing the search using the criteria provided by the user, the matching interface 500 displays matchup results (e.g., matchup 510 and matchup 518). Matchup 510 includes the title of the store that has a sale deal (e.g., Walgreens), an image that corresponds to the sale deal, a description of the sale deal, and a coupon matchup indication 516 of the number of coupon deals matched to the sale deal (e.g., "8 Coupon Matchups"). Similarly, matchup 512 includes the title of the store that has a sale deal (e.g., CVS/pharmacy), an image that corresponds to the sale deal, a description of the sale deal, and a coupon matchup indication 518 of the number of coupon deals matched to the sale deal (e.g., "4 Coupon Matchups"). In some example embodiments, the matching interface 500 may also include a sale deal for a brand for which no matching coupon deal may be found (e.g., sale deal 514). When the user selects one of the presented matchups, the system may display a further interface to provide additional details pertaining to the matchup selected by the user.

Figure 6:
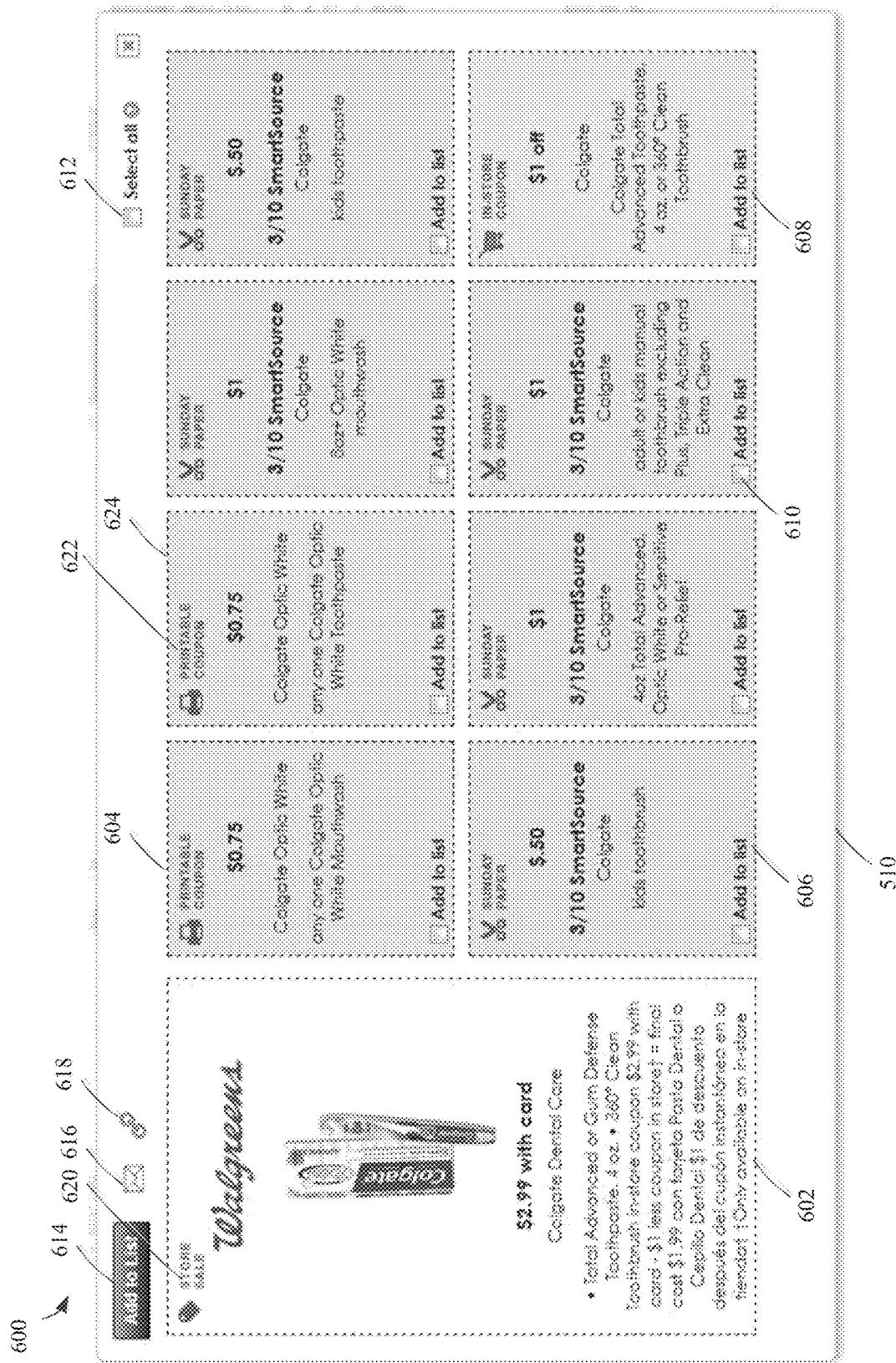

For example, FIG. 6 depicts a portion of a matchup interface 600 that displays details of the matchup 510. The matchup interface 600 includes the store sale deal 602 and eight coupons determined to match the store sale 602. The sale deal 602 includes a deal type identifier 620 that identifies the sale deal 602 as a store sale. The sale deal 602 also includes the name of the store that has the sale deal 602 (e.g., Walgreens), an image representative of the brand or product on sale, the brand name, and various terms of the sale deal 602 (e.g., a general description of the sale deal 602 "$2.99 with card for Colgate Dental Care" and additional information (in English and Spanish) that specifies actual products to which the sale deal 602 may be applicable). More or less information about the sale deal 602 may be presented to a user of the matchup interface 600. For example, in some example embodiments, the description of a sale deal includes one or more dates to indicate the date(s) of the store sale.

Examples of the matching coupons are the printable coupon 604, the Sunday Paper coupon 606, or the in-store coupon 608. Similarly to the sale deal 602, the coupon deals displayed in the matchup interface 600 include deal type identifiers that identify what type of coupons the coupon deals are. For example, the deal type identifier 622 associated with the coupon 624 identifies the coupon 624 as a Sunday paper coupon. A coupon deal may include a price or a discount amount. For example, the printable coupon 604 displays the price "$0.75" for the product "Colgate Optic White Mouthwash". In another example, the in-store coupon 608 displays the discount amount "$1 off" that can be subtracted from the price of a 4 oz. Colgate Total Advanced Toothpaste or a 360° Clean Toothbrush. Also, a brand name and coupon deal descriptions are included in the coupon deals presented to the user in the matchup interface 600. For example, in the context of the coupon deal 606, the brand name is "Colgate" and the description includes the text "kids toothbrush". In some example embodiments, the description of a coupon deal includes one or more dates to indicate when the coupon deal is valid (e.g., an expiration date, or a beginning date and an expiration date). To illustrate, the coupon deal 606 includes the date "3/10" to indicate that the coupon deal 606 is only valid on March $10^{th}$.

Further, the user may add each of the displayed coupons to a list of coupons either by selecting a respective "Add to list" button 610 or by selecting the "Select all" button 612 and then clicking on the "Add to List" button 614. The matchup interface 600 may, in some example embodiments, facilitate the transmission of one or more deals (e.g., sale, coupon, or matchup deals) to a third party (e.g., via email) by providing an e-mail icon 616. Also, the matchup interface 600 may, in some example embodiments, facilitate the sharing of deals with a third party by providing a sharing icon 618.

Figure 7:
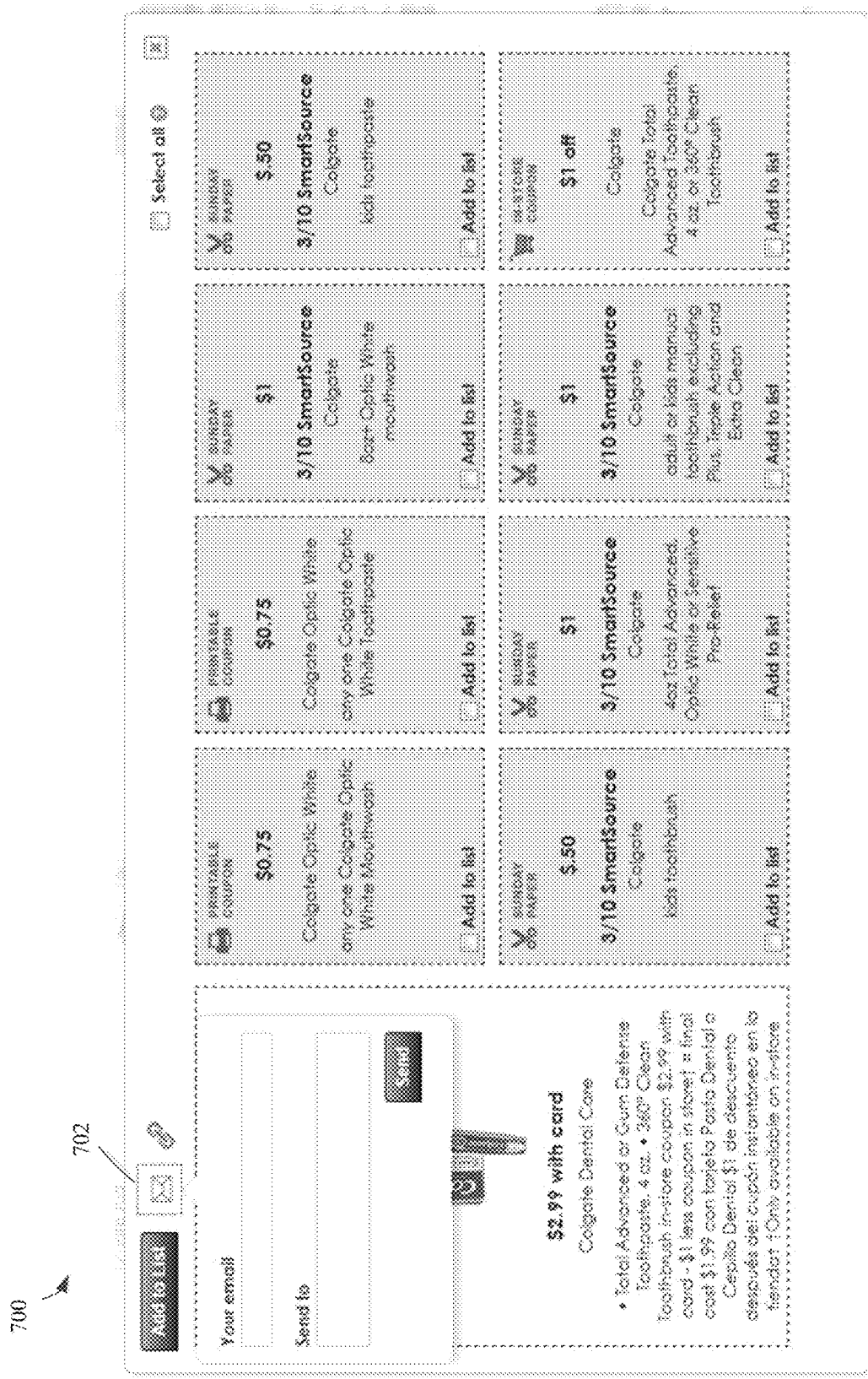

FIG. 7 is an example portion of a matchup interface 700 that displays a result of selecting the e-mail icon 702. After receiving an indication that the user selected to e-mail one or more deals, the system displays a window that includes a field to receive the user's email address and a field to receive the recipient's email address.

Figure 8:
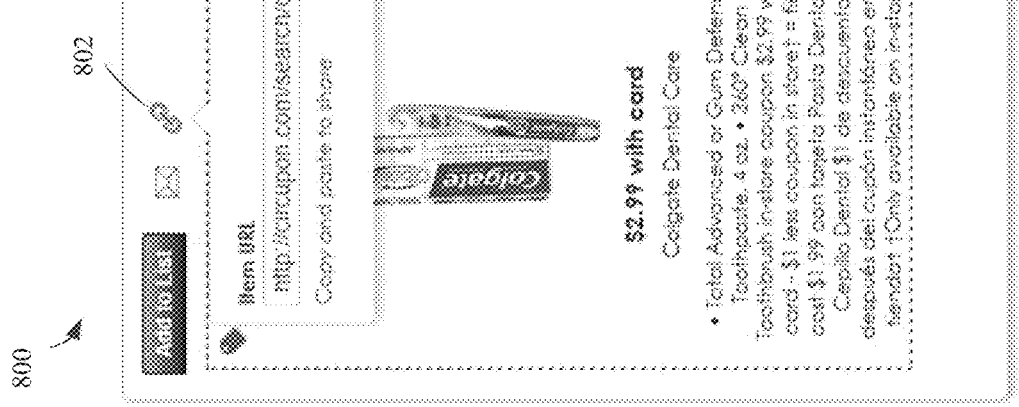

FIG. 8 is an example portion of a matchup interface 800 that displays a result of selecting the sharing icon 802. After receiving an indication that the user selected to share one or more deals, the system displays a window that includes an Item URL field to receive the Uniform Resource Locator of the deal.

Figure 9:
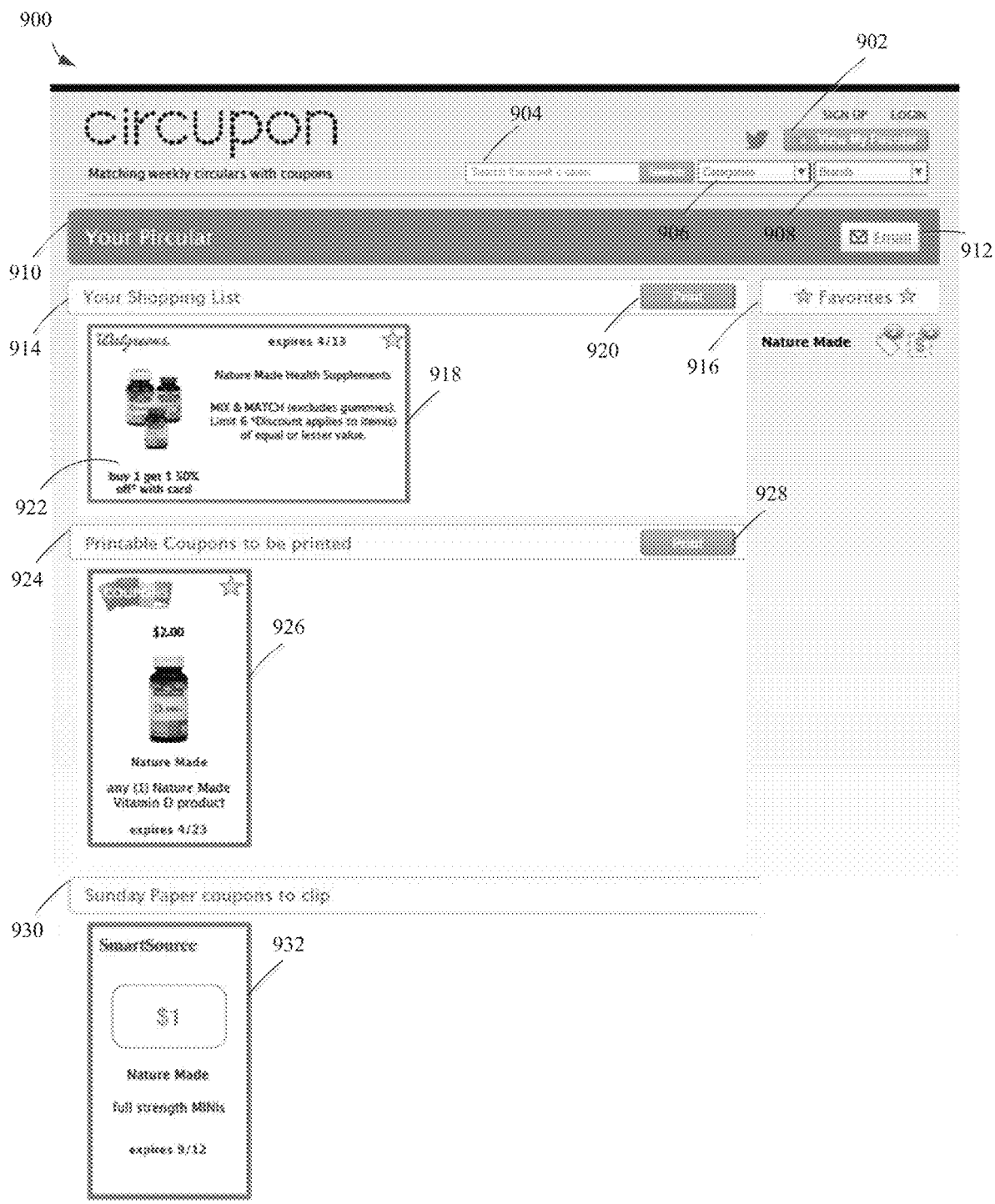

FIG. 9 is an example portion of a pircular interface 900 that displays a collection of information that may improve a user's shopping experiences and save the user money. As described above, the pircular is a savings tool (or resource) that a user may utilize from anywhere (e.g., a mobile device, a browser, an email account, etc.) The pircular may allow the user to specify a list of "favourite", for instance, preferred brands, products, or stores. The system, based on the user's preferences, may send (e.g., communicate or forward) timely updates of deals and matchups to the user's pircular. Also, the pircular may allow the user to organize the user's shopping activities and manage the user's savings mechanisms, such as sale deals, coupon deals, and matchups. The system may populate the user's pircular with the results of a user's search for matchups (e.g., using the matchup interface 500) or with searches executed by the system based on user's list of favorites. Further, the system may provide additional functionalities in the user's pircular for purposes of enhancing the user's shopping experiences and increasing the user's savings while shopping. Examples of such functionalities are the ability to receive geolocation alerts (e.g., based on the user's proximity to certain favourite stores), or the ability to manage a shopping list and the list of favourite brands, stores, products, or categories of products.

As illustrated in FIG. 9, the pircular interface 900 displays a user's pircular 910. In some example embodiments, the user may view the user's pircular from a matchup interface by selecting the "View My Pircular" button 902. As described above, a matchup interface may allow a user to search for available matchups of sale deals and coupon deals using a search field 904, a categories drop-down menu 906, and a brands drop-down menu 908.

Upon receiving a request (from a user's device) to display the user's pircular, the system may display the user's pircular (e.g., on a mobile device, a browser, etc.) in a pircular interface. The example pircular interface 900 displays the pircular 910 which includes a shopping list section 914, a pintable coupons section 924, and a Sunday paper coupons section 930. The shopping list section 914 comprises one or more items on the user's shopping list.

In some example embodiments, the pircular does not only display the user's shopping list including items to be purchased but also presents such items as being associated with particular favourite (or selected) stores or brands, or both. For example, as illustrated in FIG. 9, the shopping list 914 displays the sale deal 918 for "health supplements" (e.g., an item on the user's shopping list) associated with both a Walgreens store and a the "Nature Made" brand. The store and brand names may have been either selected by the user using the search field 502 or the brand name drop-down menu 504, respectively, or provided by the user in the user's list of favorites 916. The sale deal 918 includes an image representative of the product(s) on sale, an expiration date, a title, a description, and a sale term 922. The system allows the user to print the user's shopping list by selecting the print button 920.

Further, the printable coupons section 924 includes a printable coupon 926 that, in this example, includes a coupon source "Coupons.com", a coupon value "$2.00", a brand name "Nature Made", a coupon description "any (1) Nature Made Vitamin D product", and an expiration date "expires 4/23". The Sunday Paper coupons section 930 includes a Sunday paper coupon 932 that, in this example, includes a coupon source "SmartSource", a coupon value "$1", a brand name "Nature Made", a coupon description "full strength MINIs", and an expiration date "expires 9/12".

As described above, the system may alert the user when new deals or matchups have been transmitted to the user's pircular, or when the user is in the vicinity of a store listed in the user's list of favorites. A further alert may be sent to the user when the system determines that the user is within a pre-determined distance from the store and that the user's pircular comprises a deal or matchup that is applicable at the store. In some example embodiments, the pircular displays a map that includes an indication of a store location to assist the user in finding a store where the user may apply one or more matchups or coupons. In certain example embodiments, the system allows the user to email the user's circular using the email button 912.

Figure 10:
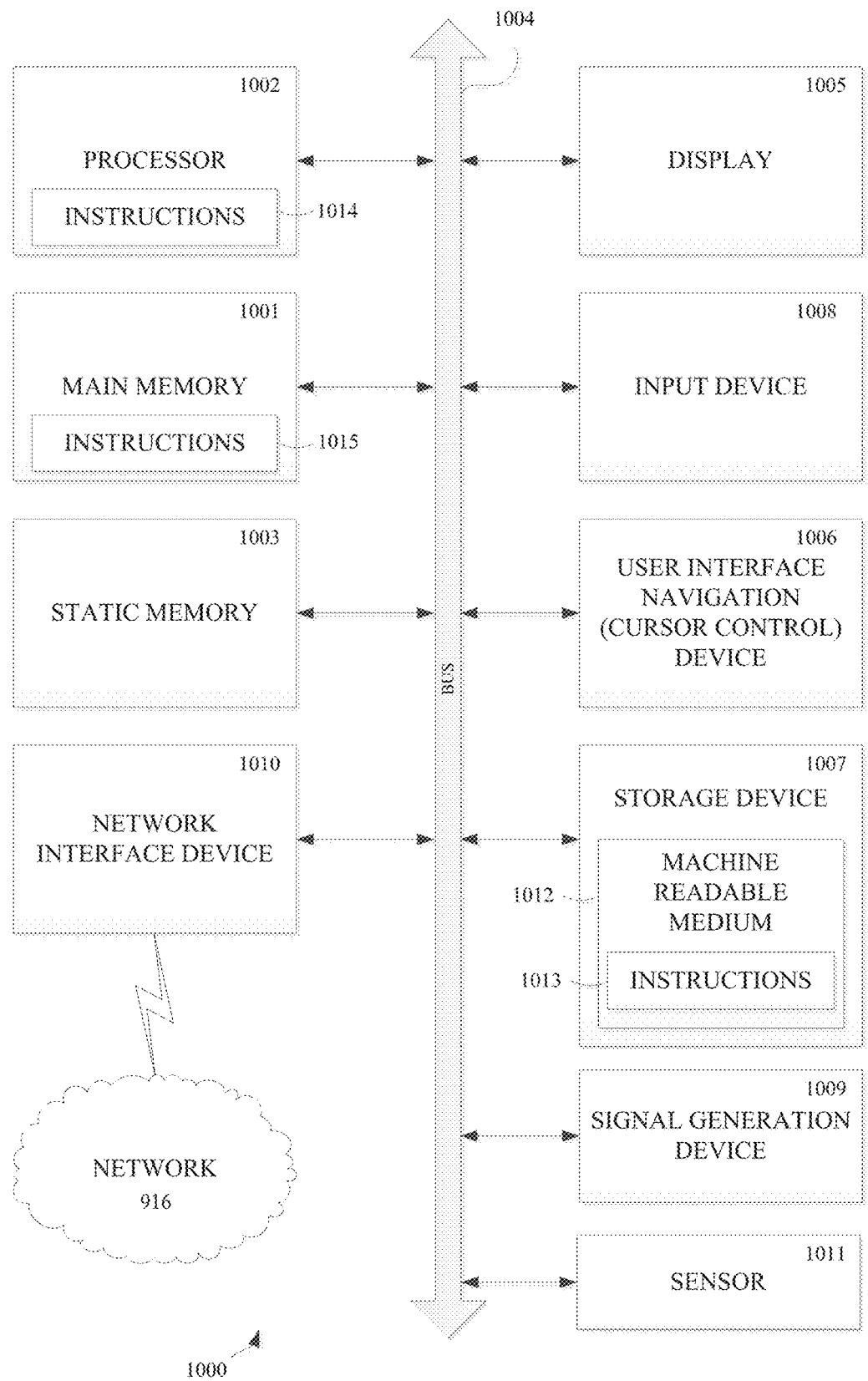
FIG. 10 is a block diagram of a machine in the example form of a computing device within which a set of instructions, for causing the machine to perform any one or more of the methodologies discussed herein, may be executed.

FIG. 10 is a block diagram of a machine in the example form of a computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1001, and a static memory 1003, which communicate with each other via a bus 1004. The computer system 1000 may further include a display unit 1005, an alphanumeric input device 1008 (e.g., a keyboard), and a user interface (UI) navigation device 1006 (e.g., a mouse). In some example embodiments, the display, input device, and cursor control device are a touch screen display. The computer system 1000 may additionally include a storage device 1007 (e.g., drive unit), a signal generation device 1009 (e.g., a speaker), a network interface device 1010, and one or more sensors 1011, such as a global positioning system sensor, compass, accelerometer, or other sensor.

The drive unit 1007 includes a machine-readable medium 1012 on which is stored one or more sets of instructions and data structures (e.g., software 1013) embodying or utilized by any one or more of the methodologies or functions described herein. The software 1013 may also reside, completely or at least partially, within the main memory 1001 and/or within the processor 1002 during execution thereof by the computer system 1000, the main memory 1001 and the processor 1002 also constituting machine-readable media.

While the machine-readable medium 1002 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding, or carrying instructions for execution by the machine, and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1013 may further be transmitted or received over a communications network 1016 using a transmission medium via the network interface device 1010 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding, or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
    one or more computer processors;
    one or more computer memories; and
    a set of instructions incorporated into the one or more computer memories, the set of instructions configuring the one or more computer processors to perform operations, the operations comprising:
    allowing contents of a brand dictionary to grow without manual intervention, the allowing including determining that a name received in deal data is to be added as a record to the brand dictionary, the determining based on a portion of the deal data being provided by a trusted provider; and
    generating a matchup of a sales deal to a coupon deal based on a determination that at least a portion of additional deal data comprises a brand identification, the determination based on a matching of the at least the portion of the additional deal data with the record added to the brand dictionary;
    generating one or more tokens based on the deal data, wherein the at least the portion of the additional deal data includes the one or more tokens; and
    receiving changes provided by an administrator to the deal data and providing the changes as input to the brand dictionary.

2. The system of claim 1, wherein the determination is alternatively based on the at least the portion of the additional deal data matching a synonym of the record added to the brand dictionary.

3. The system of claim 1, wherein the adding of the record to the brand dictionary includes storing the name as a key-value pair in a database, the key-value pair including a key corresponding to a brand type and a value including the name.

4. The system of claim 1, the operations further comprising determining that the adding of the record to the brand dictionary contributes to a number of invalid matchups, removing the record from the brand dictionary.

5. The system of claim 4, the operations further comprising blocking the name from being added back to the brand dictionary.

6. A method comprising:
    allowing contents of a brand dictionary to grow without manual intervention, the allowing including determining that a name received in deal data is to be added as a record to the brand dictionary, the determining based on a portion of the deal data being provided by a trusted provider;
    generating a matchup of a sales deal to a coupon deal based on a determination that at least a portion of additional deal data comprises a brand identification, the determination based on a matching of the at least the portion of the additional deal data with the record added to the brand dictionary;

generating one or more tokens based on the deal data, wherein the at least the portion of the additional deal data includes the one or more tokens; and receiving changes provided by an administrator to the deal data and providing the changes as input to the brand dictionary.

7. The method of claim 6, wherein the determination is alternatively based on the at least the portion of the additional deal data matching a synonym of the record added to the brand dictionary.

8. The method of claim 6, wherein the adding of the record to the brand dictionary includes storing the name as a key-value pair in a database, the key-value pair including a key corresponding to a brand type and a value including the name.

9. The method of claim 6, further comprising determining that the adding of the record to the brand dictionary contributes to a number of invalid matchups, removing the record from the brand dictionary.

10. The method of claim 9, further comprising blocking the name from being added back to the brand dictionary.

11. A non-transitory machine-readable storage medium comprising a set of instructions that, when executed by one or more computer processors, causes the one or more computer processors to perform operations, the operations comprising:

allowing contents of a brand dictionary to grow without manual intervention, the allowing including determining that a name received in deal data is to be added as a record to the brand dictionary, the determining based on a portion of the deal data being provided by a trusted provider;

generating a matchup of a sales deal to a coupon deal based on a determination that at least a portion of additional deal data comprises a brand identification, the determination based on a matching of the at least the portion of the additional deal data with the record added to the brand dictionary;

generating one or more tokens based on the deal data, wherein the at least the portion of the additional deal data includes the one or more tokens; and receiving changes provided by an administrator to the deal data and providing the changes as input to the brand dictionary.

12. The non-transitory machine-readable storage medium of claim 11, wherein the determination is alternatively based on the at least the portion of the additional deal data matching a synonym of the record added to the brand dictionary.

13. The non-transitory machine-readable storage medium of claim 11, wherein the adding of the record to the brand dictionary includes storing the name as a key-value pair in a database, the key-value pair including a key corresponding to a brand type and a value including the name.

14. The non-transitory machine-readable storage medium of claim 10, the operations further comprising determining that the adding of the record to the brand dictionary contributes to a number of invalid matchups, removing the record from the brand dictionary.

15. The non-transitory machine-readable storage medium of claim 14, the operations further comprising blocking the name from being added back to the brand dictionary.

* * * * *